United States Patent
Nam et al.

(10) Patent No.: US 8,279,277 B2
(45) Date of Patent: Oct. 2, 2012

(54) VISION WATCHING SYSTEM AND METHOD FOR SAFETY HAT

(75) Inventors: Yun young Nam, Suwon-si (KR); Moo rim Kim, Yongin-si (KR); Suck chul Kim, Gangdong-gu (KR); We Duke Cho, Seongnam-si (KR)

(73) Assignee: Ajou University Industry-Academic Cooperation Foundation, Suwon-si (KR)

( * ) Notice: Subject to any disclaimer, the term of this patent is extended or adjusted under 35 U.S.C. 154(b) by 520 days.

(21) Appl. No.: 12/588,664

(22) Filed: Oct. 22, 2009

(65) Prior Publication Data

US 2010/0245554 A1    Sep. 30, 2010

(30) Foreign Application Priority Data

Mar. 24, 2009    (KR) .................. 10-2009-0024947

(51) Int. Cl.
*H04N 7/18*    (2006.01)
*G04F 15/16*    (2006.01)

(52) U.S. Cl. .................................................. 348/77

(58) Field of Classification Search ............. 348/77–78, 348/54, 125
See application file for complete search history.

(56) References Cited

U.S. PATENT DOCUMENTS

| | | | |
|---|---|---|---|
| 7,378,963 B1* | 5/2008 | Begault et al. | 340/539.29 |
| 7,592,911 B1* | 9/2009 | Hudgens et al. | 340/539.13 |
| 2008/0266110 A1* | 10/2008 | Hayford et al. | 340/572.8 |
| 2009/0040014 A1* | 2/2009 | Knopf et al. | 340/5.1 |
| 2009/0199317 A1* | 8/2009 | Schwiers et al. | 2/5 |
| 2009/0265193 A1* | 10/2009 | Collins et al. | 705/4 |
| 2010/0289662 A1* | 11/2010 | Dasilva et al. | 340/686.6 |

\* cited by examiner

*Primary Examiner* — Zarni Maung
(74) *Attorney, Agent, or Firm* — Stein McEwen, LLP

(57) ABSTRACT

Provided are vision watching system and method for a safety hat. The vision watching system includes: a receiver which receives an image signal of a watching zone of a camera; a processor which determines whether an object of the image signal is a person, based on a size and an outline of the object and determines whether the person wears a safety hat, based on at least one or more of red (R), green (G), and blue (B) values of a head part of the person and a Hue value of Hue, Saturation, Value (HSV) of the head part; and a transmitter which outputs a Pan-Tilt-Zoom (PTZ) control signal of the camera to obtain a thumbnail image of the person when determining the person who does not wear the safety hat.

10 Claims, 4 Drawing Sheets

HLB = 1, HRB = 2   HLB = 3, HRB = 4   HLB = 5, HRB = 5

VISION WATCHING SYSTEM AND METHOD FOR SAFETY HAT

CROSS-REFERENCE TO RELATED PATENT APPLICATION

This application claims the benefit of Korean Patent Application No. 10-2009-0024947, filed on Mar. 24, 2009, in the Korean Intellectual Property Office, the disclosure of which is incorporated herein in its entirety by reference.

BACKGROUND OF THE INVENTION

1. Field of the Invention

The present invention relates to vision watching system and method for a safety hat, and more particularly, to a vision watching system and method for a safety hat by which a person who does not wear a safety hat within a watching zone is recognized and a warning message is transmitted to the person in order to prevent the person from meeting with a life accident in a construction field, on a bicycle road, or during traveling of a two-wheeler.

2. Description of the Related Art

According to a report, life accidents caused by safety hat not-wearing in a construction field, on a bicycle road, or during travelling of a two-wheeler can be greatly reduced simply by safety hat wearing.

The construction field is more frequently exposed to danger than other fields and thus requires constant safety. Since persons transfer unsafe structures in the construction field, they are in high danger of falling accidents.

The persons are also in danger of hurting due to use of heavy equipment and falling objects. Death accidents caused by falling or dropping mostly occupy many parts of accidents patterns in a building or construction field.

Safe equipment protects the persons in this situation. In particular, a safety hat protects a head of a person which is an important part of the body of the person in order to protect the person from danger.

91.7% of 35.4% of the dead workers did not wear protective equipment in workshops in which workers must wear protective equipment such as safety hats, safety bars, or the like. Thus, protective equipment is regarded as absolute equipment for preventing death accidents caused by falling or dropping.

A measurement has been conducted that a safety hat which is a kind of protective equipment relieves 90% or more of transmitted shock power. Therefore, workers must wear safety hats or safety bars to minimize wounds caused by falling or dropping accidents.

When a person has a traffic accident without a safety hat, a probability of the person being died rises by 45%. Also, 70% of bicycle safety accidents correspond to children's accidents. However, only wearing safety hats can greatly reduce wound dangers.

When there is not a direction or a notice of a supervisor or a protector in a construction field or on a bicycle road, life accidents will occur. Thus, equipment for leading persons to wear safety hats is required.

Accordingly, a vision watching method is used to identify whether a person wears a safety hat in order to recommend the persons to wear the safety hat and prevent accidents in a construction field.

SUMMARY OF THE INVENTION

The present invention provides a vision watching system and method for a safety hat by which a person who does not wear a safety hat within a watching zone is recognized and a warning message is transmitted to the person in order to prevent the person from meeting with a life accident in a construction field, on a bicycle road, or during traveling of a two-wheeler.

According to an aspect of the present invention, there is provided a vision watching system for a safety hat, including: a receiver which receives an image signal of a watching zone of a camera; a processor which determines whether an object of the image signal is a person, based on a size and an outline of the object and determines whether the person wears a safety hat, based on at least one or more of red (R), green (G), and blue (B) values of a head part of the person and a Hue value of Hue, Saturation, Value (HSV) of the head part; and a transmitter which outputs a Pan-Tilt-Zoom (PTZ) control signal of the camera to obtain a thumbnail image of the person when determining the person who does not wear the safety hat.

According to another aspect of the present invention, there is provided a vision watching system for a safety hat, including: a camera which photographs a watching zone; an image signal processor which receives an image signal of the camera watching area, determines whether an object of the image signal is a person, based on a size and an outline of the object, and determines whether the person wears a safety hat, based on at least one or more of RGB values of a head part of the person and a H value of HSV of the head part to output a PTZ control signal of the camera for obtaining a thumbnail image of the person when determining the person; and a controller which displays the thumbnail image on a screen, generates events on the track of a moving path of the person, and communicates the fact that the person does not wear the safety hat to the person in real time.

According to another aspect of the present invention, there is provided a vision watching method for a safety hat, including: receiving an image signal of a watching zone of a camera; determining whether an object of the image signal is a person, based on a size and an outline of the object and determining whether the person wears a safety hat, based on at least one or more of RGB values of a head part of the person and a H value of HSV of the head part; outputting a PTZ control signal of the camera for obtaining a thumbnail image of the person when determining the person; receiving the thumbnail image of the person; and displaying the thumbnail image on a screen, generating events on the track of a moving path of the person, and communicating the fact that the person does not wear the safety hat to the person in real time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described in detail with reference to the attached drawings.

A vision watching system for a safety hat according to the present invention can be widely applied to a construction field, an in-line skate field, a bicycle road, or a road crossing but will be limited to a construction field hereinafter.

Figure 1A:
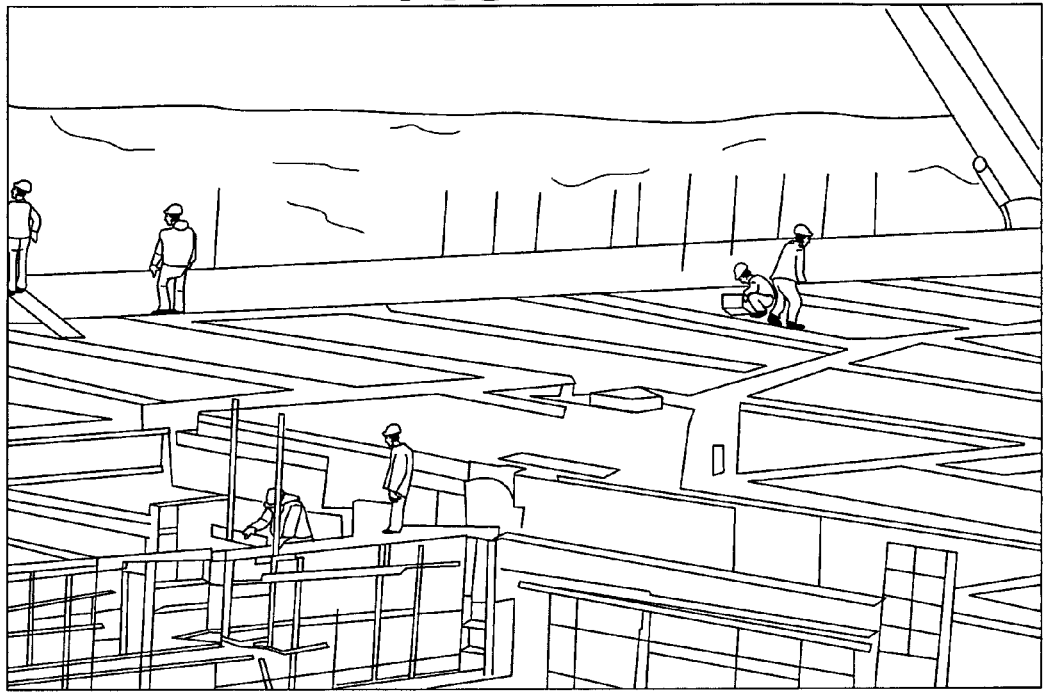
FIG. 1A illustrates a real construction field.
Figure 1B:
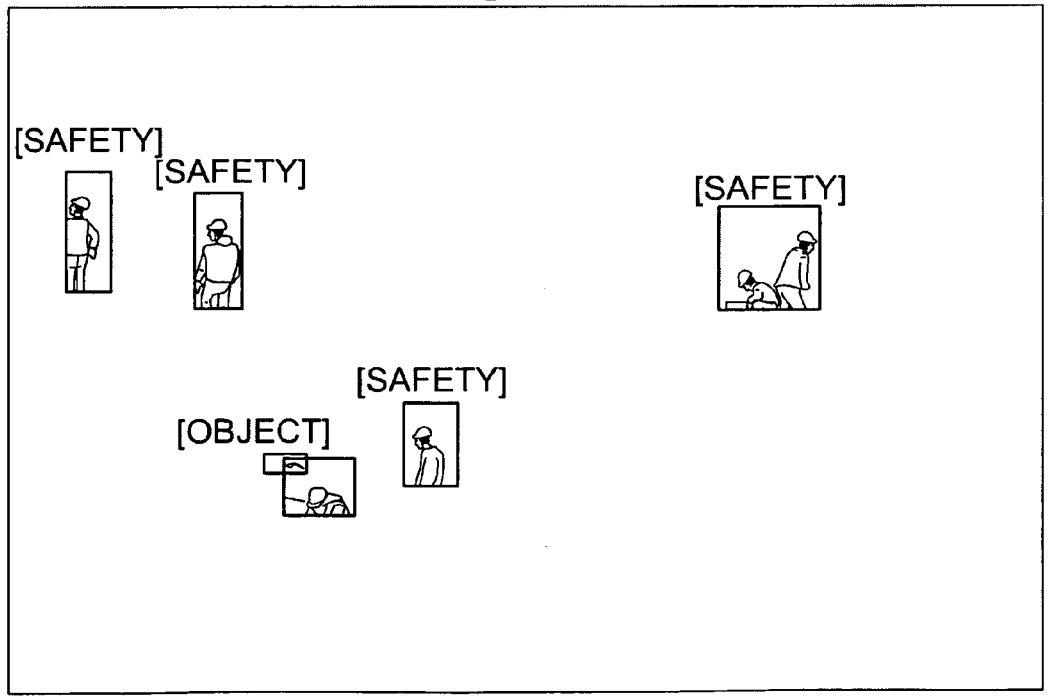
FIG. 1B illustrates a vision watching system for a safety hat, used in the real construction field, according to an embodiment of the present invention.

FIG. 1A illustrates a real construction field, and FIG. 1B illustrates a vision watching system for a safety hat, used in the real construction field, according to an embodiment of the present invention.

The vision watching system of the present invention recognizes persons in a construction field and displays on a screen whether the persons wear safety hats, with safety and warning messages, and assists a monitoring staff or a supervisor in a control center to easily recognize whether the persons wear the safety hats.

Figure 1C:
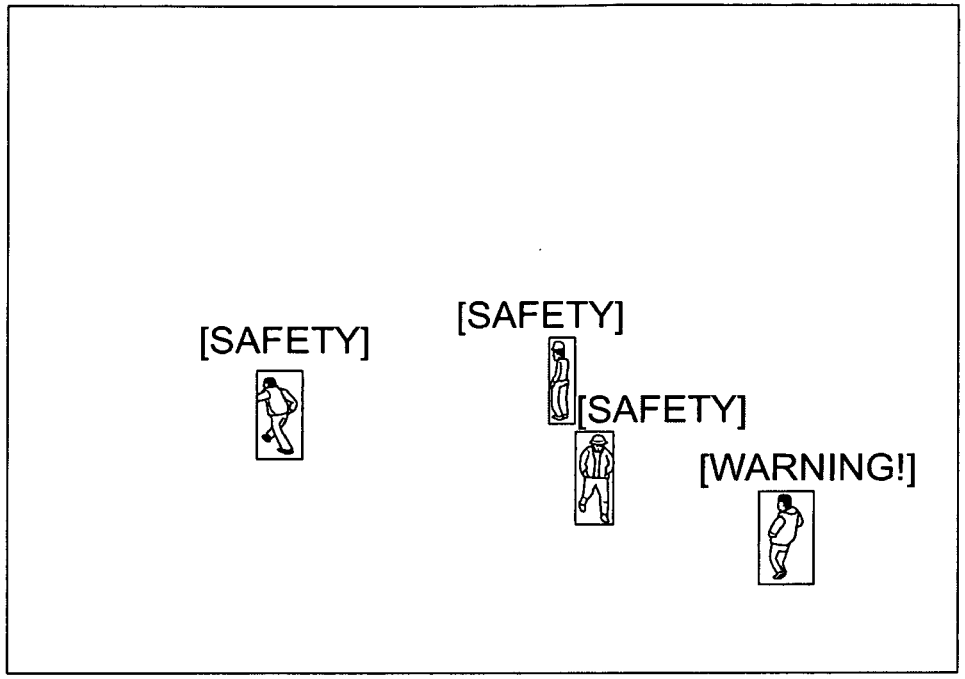
FIG. 1C illustrates a vision watching system for a safety hat, used in the real construction field, according to another embodiment of the present invention.

FIG. 1C illustrates a vision watching system for a safety hat, used in the real construction field, according to another embodiment of the present invention.

The vision watching system displays a warning message with respect to an image of a person who does not wear a safety hat.

The vision watching system of the present invention distinguishes persons from low-resolution images in real time and determines whether the persons wear safety hats.

Figure 2:
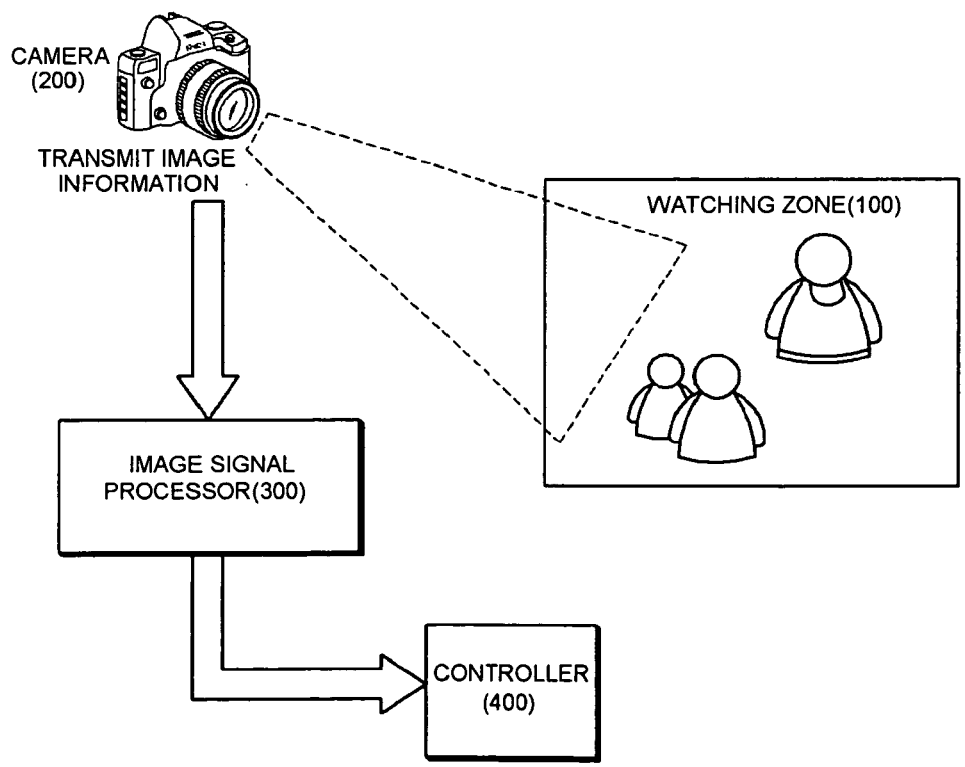
FIG. 2 illustrates a vision watching system for a safety hat according to an embodiment of the present invention.

FIG. 2 is a block diagram of a vision watching system for a safety hat according to an embodiment of the present invention. Referring to FIG. 2, the vision watching system includes a camera 200 which watches a watching zone 100 of a construction field, an image signal processor 300, and a controller 400.

The camera 200 watches and photographs the watching zone 100.

The camera 200 is a 640×480 low-resolution camera and thus is advantageous in terms of cost saving.

The camera 200 of the vision watching system may be positioned at a long distance from the watching zone 100.

The camera 200 has "Pan," "Tilt," and "Zoom" functions to track and/or magnify a person who does not wear a safety hat.

The image signal processor 300 receives an image signal of the watching zone 100, determines whether an object of the image signal is a person based on a size and an outline of the object, and determines whether the person wears a safety hat, based on at least one or more of red (R), green (G), and blue (B) values of a head part of the person and a Hue (H) value of Hue, Saturation, Value (HSV) of the head part. Thus, the image signal processor 300 outputs a Pan-Tilt-Zoom (PTZ) control signal of the camera 200 to obtain a thumbnail image of a person who does not wear a safety hat.

The determination of the image signal processor 300 as to whether the person wears the safety hat from the image signal of the watching zone 100 is achieved through the following steps.

The image signal processor 300 distinguishes 1) a person, 2) a head of the person, and 3) whether the person wears a safety hat, from the object of the image signal.

The image signal processor 300 determines whether the object of the image signal of the watching zone 100 is the person, based on the size and outline of the object.

In the case of construction field, a form of a building continuously varies with the progress of construction.

Therefore, in order to remove an error in a determination of a newly built structure as a person, an object which does not move within a predetermined period of time is determined as a new building to be excluded from the determination as the person.

A head part is required to be detected from an object determined as a person. A point addition method may be used to detect the head part.

The determination as to whether the person wears the safety hat may be performed based on an H value of the HSV of the head part.

A color of a safety hat may be white, yellow, red, or the like. However, the color of the safety hat is not limited but may vary:

The H value of the HSV is less affected by light than RGB values and expresses its own color and thus is mainly used to analyze colors.

However, it is difficult to determine an achromatic color (e.g., black, white, or gray) using only an H value.

RGB values and an H value of HSV must be used to detect a safety hat from which white and black colors are mainly determined.

Reflectivity or other factors may be simultaneously considered with RGB values or an H value of HSV to prevent an error in a determination as to whether a person wears a safety hat.

RGB values or an H value of HSV are extracted depending on a color of a safety hat and compared with pre-set reference RGB values or an H value of pre-set reference HSV to perform the determination as to whether the person wears the safety hat.

The image signal processor 300 receives the thumbnail image of the person who does not wear the safety hat, wherein the thumbnail image has been obtained by the camera 200 according to the PTZ control signal, and transmits the thumbnail image to the controller 400.

The controller 400 displays the thumbnail image on a screen, displays the person, who does not wear the safety hat, with a minimum bounding rectangle (MBR) on the screen, and generates events on the track of a moving path of the person.

For example, as shown in FIG. 1C, the controller 400 displays persons, who wear safety hats, with safety messages on the screen and a person, who does not wear a safety hat, with a warning message on the screen, depending on whether the persons moving within the watching zone 100 wear the safety hats. Thus, the controller 400 assists a system manager to easily recognize whether the persons wear the safety hats.

Figure 3:
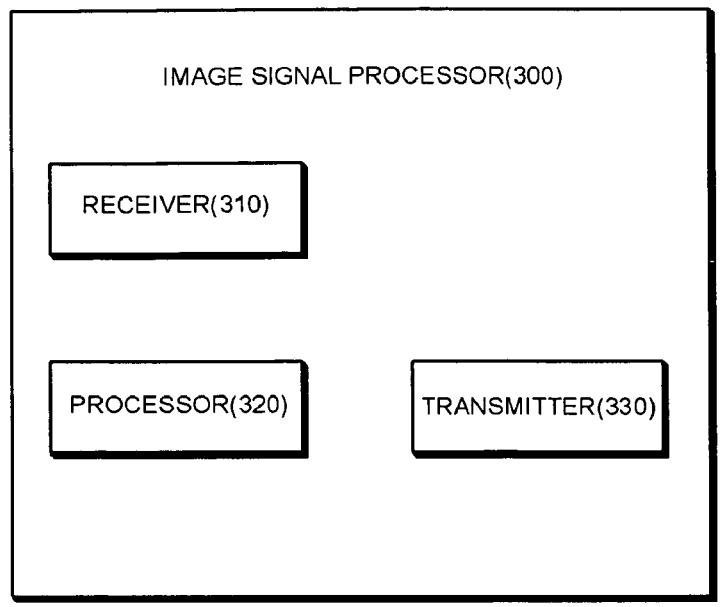
FIG. 3 is a block diagram of an image signal processor 300 of the vision watching system of FIG. 2, according to an embodiment of the present invention.

FIG. 3 is a block diagram of the image signal processor 300 of the vision watching system, according to an embodiment of the present invention.

The image signal processor 300 includes a receiver 310, a processor 320, and a transmitter 330.

The image signal processor 300 may be realized as an image processing server which includes a safety hat wearing determining algorithm.

The receiver 310 of the image signal processor 300 receives the image signal of the watching zone 100 of the camera 200 or the thumbnail image of the person who does not wear the safety hat, from the camera 200, wherein the thumbnail image has been obtained using the PTZ control signal when determining whether the person wears the safety hat.

The processor 320 determines whether the object of the image signal received from the camera 200 is the person, based on the size and outline of the object.

A point addition method is used to detect a head part from the object which has been determined as the person.

Figure 4:
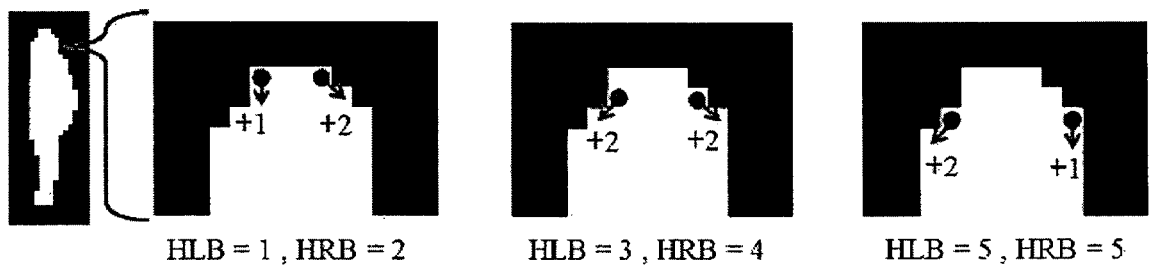
FIG. 4 illustrates a method of detecting a head part of a person using a vision watching system for a safety hat, according to an embodiment of the present invention.

FIG. 4 illustrates a method of detecting a head part of a person using a vision watching system for a safety hat, according to an embodiment of the present invention.

In the point addition method, a position of each pixel is checked from outline information of an object. When the object is a head part, a point is given to the head part. When the point exceeds a threshold value, the object is predicted as a head.

When a person is seen with a camera at a resolution of 640*480 pixels at a distance of 50 m or more, a size of the person is measured with pixels of about 15*50. In this case, pixels of a head part of the person are about 8*8.

A point addition method for detecting a head using a vision watching system for a safety hat according to the present invention relatively accurately predict the head and does not require many operations. Thus, the point addition method may be processed in real time.

Points are given as follows.

1) Two high rank points having greatest Y values are determined from the detected object. If each of the two high rank points is higher than or equal to a threshold value, it is determined that the detected object is not a head.

2) If each of the two high rank points is lower than or equal to the threshold value, points most adjacent to the left and right parts of each of the two high rank points are selected. If the selected points are directed downward, +1 is given, and if the selected points are directed diagonally, +2 is given.

3) A size of a head part is predicted in proportion to a size of the detected object to continue the method of 2).

4) If a sum of the left and right points is higher than or equal to the threshold value, the detected object is determined as a head.

A determination is made as to whether an object determined as a person wears a safety hat, based on RGB values of a head part of the person or an H value of HSV.

RGB values or an H value of HSV are extracted depending on a color of the safety hat and compared with pre-set reference RGB values or an H value of pre-set reference HSV in order to determine whether the person wears the safety hat.

The transmitter 330 outputs the PTZ control signal for obtaining the thumbnail image of the person who does not wear the safety hat when determining whether the person wears the safety hat or adds position and time information of the person to the thumbnail image which has been received from the camera 200 and transmits the thumbnail image including the position and time information to the controller 400.

Figure 5:
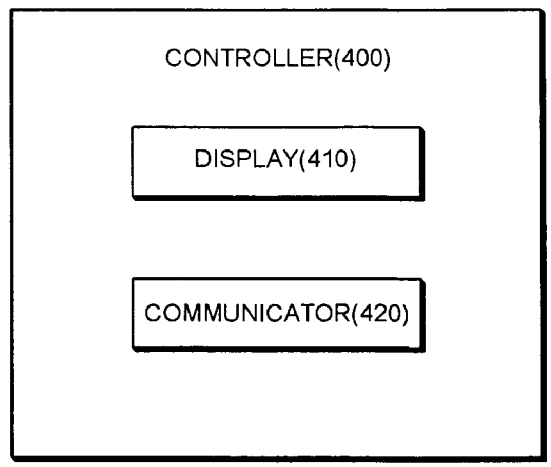
FIG. 5 is a block diagram of a controller 400 of the vision watching system of FIG. 2, according to an embodiment of the present invention.

FIG. 5 is a block diagram of the controller 400 of the vision watching system, according to an embodiment of the present invention.

The controller 400 includes a display 410 and a communicator 420.

The controller 400 of the vision watching system may be a safety management control center in which a system manger is positioned.

The display 410 of the controller 400 displays the position and time information and the thumbnail image of the person who does not wear the safety hat, on the screen and generates the events on the track of a moving path of the person.

In other words, the display 410 displays a person, who wears a safety hat within the watching zone 100 of the camera 200, as a safety message on the screen of the controller 400 and a person who does not wear a safety hat, as a warning message on the screen in order to assist the system manager or the monitoring staff to easily recognize whether the persons wear the safety hats.

Figure 6:
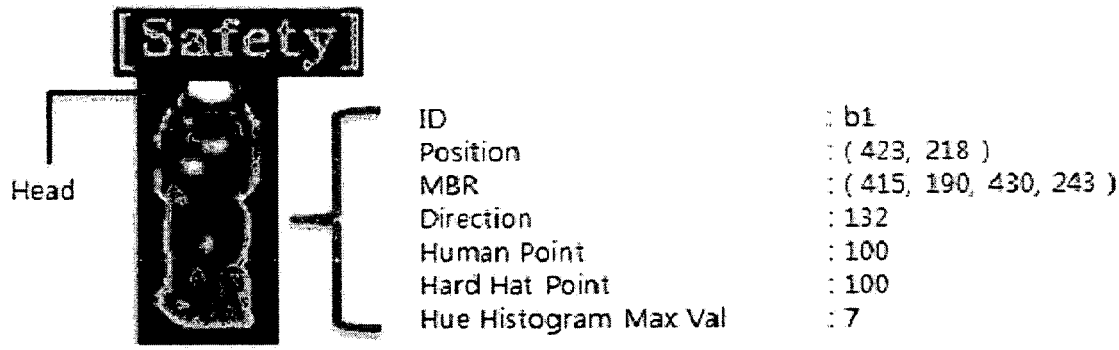
FIG. 6 illustrates information about an object detected by a vision watching system for a safety hat, according to an embodiment of the present invention.

FIG. 6 illustrates information about an object detected by the vision watching system, according to an embodiment of the present invention.

Referring to FIG. 6, a MBR is set with respect to an object of a thumbnail image which has been determined as a person and information necessary for tracking the object is displayed.

The object determined as the person is tracked using a distance between central points, a histogram, a direction, and a size. If the tracked object corresponds to the object determined as the person, the distance between the central points is shorter than or equal to a predetermined distance, and the histogram, the direction, and the size of the object are similar to a histogram, a direction, and a size of the tracked object.

Central points, histograms, orientations, and size of all kinds of objects are calculated so as to store information about them. Thus, all of objects of a new frame are compared with one another to find out an object which corresponds to an object to be tracked. Even if objects cross one another and then separate from one another in this method, the same object may be continuously tracked.

Auto tracking may be performed with respect to the same object using tracking information about the same object.

The communicator 420 immediately communicates dangerous factors caused by not-wearing of the safety hat to the person who does not wear the safety hat.

The communication of not-wearing of the safety hat may be performed using various methods by which a person who does not wear a safety hat can recognize danger of not-wearing.

According to another aspect of the present invention, a monitoring staff or a manager in a safety control center may communicate danger to a person who does not wear a safety hat, through broadcasting.

Figure 7:
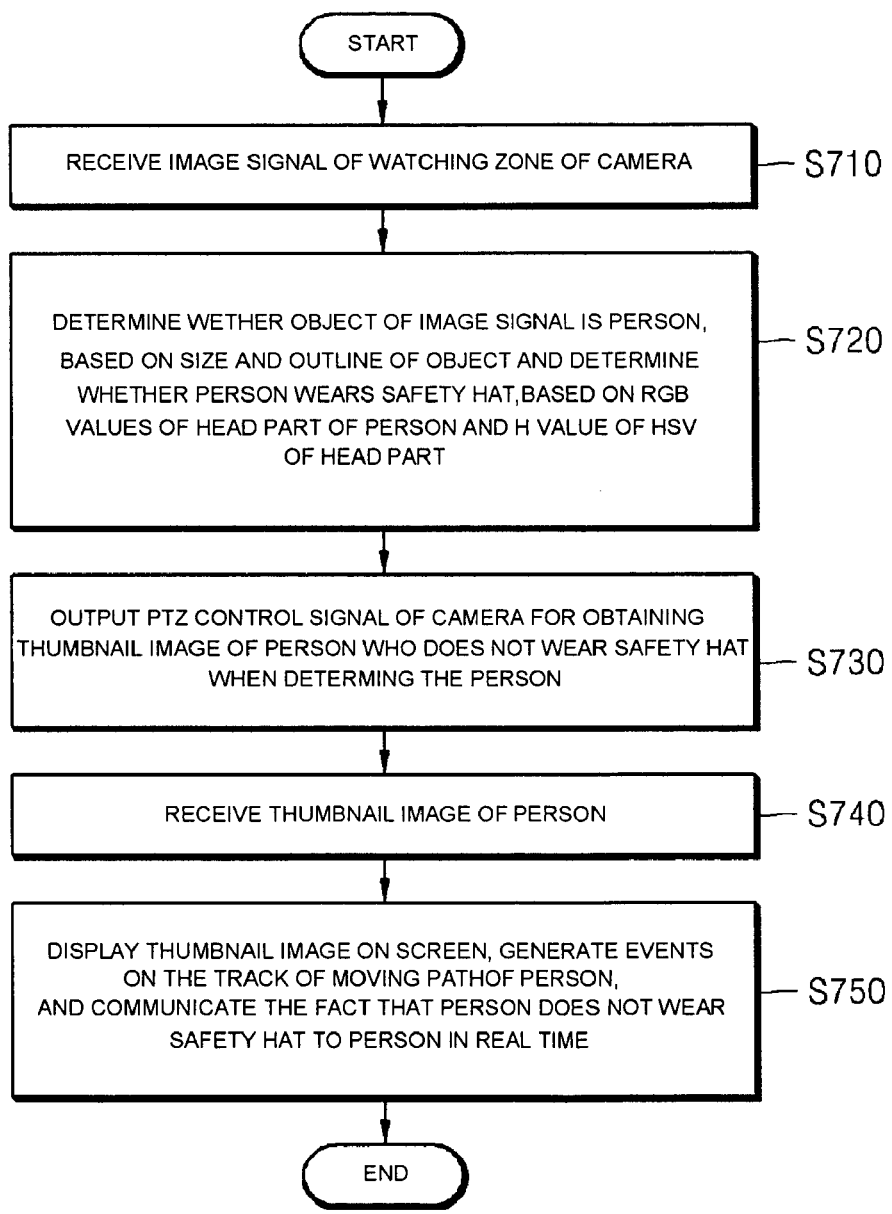
FIG. 7 is a flowchart of a vision watching method for a safety hat, according to an embodiment of the present invention.

FIG. 7 is a flowchart of a vision watching method for a safety hat, according to an embodiment of the present invention.

In operation S710, the receiver 310 of the image signal processor 300 receives the image signal of the watching zone 100 of the camera 200.

In operation S720, a determination is made as to whether the object of the image signal is a person, based on the size and the outline of the object, and a determination is made as to whether the person wears a safety hat, based on at least one or more of RGB values of a head part of the person and a H value of HSV of the head part.

In operation S730, the PTZ control signal of the camera 200 is output to obtain the thumbnail image of the person who does not wear the safety hat when determining whether the person wears the safety hat.

In operation S740, the receiver 310 of the image signal processor 300 receives the thumbnail image of the person which has been obtained by the camera 200.

In operation S750, the thumbnail image is displayed on the screen, the events are generated on the track of the moving path of the person, and the person is communicated with the fact that the person does not wear the safety hat.

Vision watching system and method for a safety hat according to the present invention can prevent a life accident of a worker in a construction field or an in-line skater who does not wear a safety hat. Also, a low-resolution camera can be used to prevent accidents. Thus, cost can be saved, and a person who does not wear a safety hat can be recognized not to wear the safety hat in real time. As a result, life accidents can be greatly prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A vision watching system for a safety hat, comprising:
a receiver which receives an image signal of a watching zone of a camera;
a processor which determines whether an object of the image signal is a person, based on a size and an outline of the object and determines whether the person wears a safety hat, based on at least one or more of red (R), green (G), and blue (B) values of a head part of the person and a Hue value of Hue, Saturation, Value (HSV) of the head part; and
a transmitter which outputs a Pan-Tilt-Zoom (PTZ) control signal of the camera to obtain a thumbnail image of the person when determining the person who does not wear the safety hat.

2. The vision watching system of claim 1, wherein the receiver receives the thumbnail image of the person obtained by the PTZ control signal of the camera, and the transmitter transmits the thumbnail image.

3. The vision watching system of claim 1, wherein the camera is a camera having a resolution less than or equal to a predetermined reference value, and the image signal processor determines whether the person wears the safety hat, based on comparison results between the RGB values and pre-set reference RGB values or a comparison result between the H value of the HSV and a H value of pre-set reference HSV.

4. The vision watching system of claim 1 or, wherein a position of a pixel is extracted from two points having greatest sizes of the object to detect the head part of the person.

5. A vision watching system for a safety hat, comprising:
a camera which photographs a watching zone;
an image signal processor which receives an image signal of the camera watching area, determines whether an object of the image signal is a person, based on a size and an outline of the object, and determines whether the person wears a safety hat, based on at least one or more of RGB values of a head part of the person and a H value of HSV of the head part to output a PTZ control signal of the camera for obtaining a thumbnail image of the person when determining the person; and
a controller which displays the thumbnail image on a screen, generates events on the track of a moving path of the person, and communicates the fact that the person does not wear the safety hat to the person in real time.

6. The vision watching system of claim 5, wherein the moving path of the person is tracked based on a central point, a histogram, a direction, and a size of the person.

7. A vision watching method for a safety hat, comprising:
receiving an image signal of a watching zone of a camera;
determining whether an object of the image signal is a person, based on a size and an outline of the object and determining whether the person wears a safety hat, based on at least one or more of RGB values of a head part of the person and a H value of HSV of the head part;
outputting a PTZ control signal of the camera for obtaining a thumbnail image of the person when determining the person;
receiving the thumbnail image of the person; and
displaying the thumbnail image on a screen, generating events on the track of a moving path of the person, and communicating the fact that the person does not wear the safety hat to the person in real time.

8. The vision watching method of claim 7, wherein the camera is a camera having a resolution less than or equal to a predetermined reference value, and the processor determines whether the person wears the safety hat, based on comparison results between the RGB values and pre-set reference RGB values or a comparison result between the H value and a H value of a pre-set reference HSV.

9. The vision watching method of claim 7, wherein a position of a pixel is extracted from two points having two greatest sizes of the object to detect the head part of the person.

10. The vision watching method of claim 7, wherein the moving path of the person is tracked based on a central point, a histogram, a direction, and a size of the person.

* * * * *

UNITED STATES PATENT AND TRADEMARK OFFICE
CERTIFICATE OF CORRECTION

| | | |
|---|---|---|
| PATENT NO. | : 8,279,277 B2 | Page 1 of 1 |
| APPLICATION NO. | : 12/588664 | |
| DATED | : October 2, 2012 | |
| INVENTOR(S) | : Yun Young Nam et al. | |

It is certified that error appears in the above-identified patent and that said Letters Patent is hereby corrected as shown below:

Column 7, Claim 4, line 46, after "claim 1" delete "or".

Signed and Sealed this
Fifteenth Day of January, 2013

David J. Kappos
*Director of the United States Patent and Trademark Office*